US009833969B2

(12) United States Patent
Chivrac et al.

(10) Patent No.: US 9,833,969 B2
(45) Date of Patent: Dec. 5, 2017

(54) ARTICLE COMPRISING POLYLACTIC ACID LAYERS AND PROCESS OF MAKING THE SAME

(71) Applicants: Compagnie Gervais Danone, Paris (FR); Clariant International Ltd., Muttenz (CH)

(72) Inventors: Frédéric Chivrac, Aix en Provence (FR); Anne-Flore Jacob, Sciez (FR); Jan-Eric Wegner, Hamburg (DE); Mirco Groeseling, Ahrensburg (DE)

(73) Assignees: Compagnie Gervais Danone, Paris (FR); Clariant International Ltd., Muttenz (CH)

( * ) Notice: Subject to any disclaimer, the term of this patent is extended or adjusted under 35 U.S.C. 154(b) by 218 days.

(21) Appl. No.: 14/439,080

(22) PCT Filed: Oct. 29, 2013

(86) PCT No.: PCT/EP2013/072564
§ 371 (c)(1),
(2) Date: Apr. 28, 2015

(87) PCT Pub. No.: WO2014/067923
PCT Pub. Date: May 8, 2014

(65) Prior Publication Data
US 2015/0290907 A1 Oct. 15, 2015

(30) Foreign Application Priority Data

Oct. 30, 2012 (WO) .................. PCT/IB2012/002421

(51) Int. Cl.
*B29C 47/00* (2006.01)
*B32B 5/18* (2006.01)
(Continued)

(52) U.S. Cl.
CPC ............ *B32B 5/18* (2013.01); *B29C 47/0004* (2013.01); *B32B 1/02* (2013.01); *B32B 27/065* (2013.01); *B32B 27/08* (2013.01); *B32B 27/18* (2013.01); *B32B 27/36* (2013.01); *C08J 9/0023* (2013.01); *B29K 2067/046* (2013.01);
(Continued)

(58) Field of Classification Search
USPC .................... 428/318.4, 318.6, 319.3, 319.7
See application file for complete search history.

(56) References Cited

U.S. PATENT DOCUMENTS 3,287,443 A   11/1966   Saito et al.
3,657,391 A   4/1972   Curfman
(Continued)

FOREIGN PATENT DOCUMENTS

CN   101899167 A   12/2010
EP   1 798 029 A1   6/2007
(Continued)

OTHER PUBLICATIONS

International Search Report and Written Opinion from International Application No. PCT/EP2013/072564 dated Nov. 26, 2013.

*Primary Examiner* — Ramsey Zacharia
(74) *Attorney, Agent, or Firm* — Greenberg Traurig, LLP

(57) ABSTRACT

The invention concerns an article comprising layers of polylactic acid and a process of making the same. A layer is of foamed polylactic acid. A layer preferably comprises an impact modifier. The article can be used in the field of packaging.

22 Claims, 1 Drawing Sheet

(51) Int. Cl.
  *B32B 27/08* (2006.01)
  *B32B 27/18* (2006.01)
  *B32B 27/36* (2006.01)
  *C08J 9/08* (2006.01)
  *B32B 1/02* (2006.01)
  *B32B 27/06* (2006.01)
  *C08J 9/00* (2006.01)
  *B29K 67/00* (2006.01)
  *B29L 31/00* (2006.01)

(52) U.S. Cl.
  CPC ..... *B29L 2031/712* (2013.01); *B32B 2250/24* (2013.01); *B32B 2250/244* (2013.01); *B32B 2250/40* (2013.01); *B32B 2266/0264* (2013.01); *B32B 2305/022* (2013.01); *B32B 2307/558* (2013.01); *B32B 2307/7163* (2013.01); *B32B 2307/72* (2013.01); *B32B 2307/738* (2013.01); *B32B 2439/00* (2013.01); *B32B 2439/70* (2013.01); *C08J 9/08* (2013.01); *C08J 2203/00* (2013.01); *C08J 2203/02* (2013.01)

(56) References Cited

U.S. PATENT DOCUMENTS

| | | |
|---|---|---|
| 3,808,180 A | 4/1974 | Owens |
| 3,985,704 A | 10/1976 | Jones et al. |
| 4,096,202 A | 6/1978 | Farnham et al. |
| 4,180,494 A | 12/1979 | Fromuth et al. |
| 4,260,693 A | 4/1981 | Liu |
| 4,299,928 A | 11/1981 | Witman |
| 2010/0086758 A1 | 4/2010 | Takase et al. |
| 2011/0226789 A1 | 9/2011 | Georgelos et al. |

FOREIGN PATENT DOCUMENTS

| | | |
|---|---|---|
| EP | 2 065 435 A1 | 6/2009 |
| EP | 2 465 883 A1 | 6/2012 |
| FR | 2851227 A1 | 8/2004 |
| JP | 2002-173589 A | 4/2002 |
| JP | 2006-168321 A | 6/2006 |
| JP | 2010-202196 A | 9/2010 |
| WO | 2005/042627 A1 | 5/2005 |
| WO | 2007/145905 A2 | 12/2007 |
| WO | 2008/051443 A1 | 5/2008 |
| WO | 2010/007004 A1 | 1/2010 |
| WO | 2011/119639 A1 | 9/2011 |
| WO | 2013/160717 A1 | 10/2013 |

ARTICLE COMPRISING POLYLACTIC ACID LAYERS AND PROCESS OF MAKING THE SAME

This application is a national phase filing under 35 USC 371 of International Application No. PCT/EP2013/072564, filed on Oct. 29, 2013, which claims the benefit of International Application No. PCT/IB2012/002421, filed on Oct. 30, 2012, the entirety of these applications is hereby incorporated herein by reference in their entirety for all purposes.

The invention concerns an article comprising foamed polylactic acid and a process of making the same. The article can be used in the field of packaging. It presents good properties, including a good snapability.

Polylactic Acid (PLA) is a thermoplastic polymer made from renewable resources. It has a significant biodegradability. PLA plastic sheets are used to make thermoformed containers. There is however a need for lowering the amount of material used in packaging, without significantly impacting mechanical properties or other properties.

A solution to lower the amount of materials is to incorporate in thermoplastic materials, for example in polystyrene, foaming agents that generate gas compounds upon heating. Examples of such foaming agents include an association of citric acid and sodium bicarbonate, which react together upon heating and generate carbon dioxide and water.

Document CN101899167 discloses the incorporation of expandable microspheres in PLA to prepare foamed PLA monolayer sheets. However such sheets are hardly adapted to some packaging applications such as food applications, because the foamed structure does not provide a barrier to some agents, for example to contaminants or to agents that can alter food products such as oxygen. There is a need for other articles.

Meanwhile, incorporation of expandable microspheres is preferably done without using a gear pump because such equipment involves much shear forces which can damage the microspheres and thus lower their expansion. On the other hand, the use of a gear pump to incorporate additives is usually preferred to control other properties, such as homogeneity, which can be of importance for articles in the form of a plastic sheet and further transformation such as thermoforming. Hence, there is a need for technologies other than technologies involving expandable microspheres.

Besides, articles for packaging might require some specific properties such as snapability (ability to separate multipack containers under flexural solicitation). Such a property is usually obtained on container production lines during precut steps. Precut steps involve implementing a mechanical trimming tool that impacts and penetrates the plastic sheet with a controlled precut depth. Implementing this step is particularly difficult with PLA since it is a brittle material. Thus, cracks appear on containers edges and on the container surface along precut lines. Consequently, it is hardly possible to separate the cups without affecting the integrity of the container. Thus, there is a need for PLA articles which present an improved snapability, for example with brittleness decrease, to produce multipack containers. Other properties of interest include density, mechanical properties, compromises thereof, and also processability upon further forming steps.

Document US 2010/0086758 discloses monolayer foamed PLA sheets, free of any impact modifier. However such sheets are hardly adapted to some packaging applications such as food applications, because the foamed structure does not provide a barrier to some agents, for example to contaminants or to agents that can alter food products such as oxygen. Such sheets are also believed to present a poor snapability, and there is a need for different products with a better snapability.

Document EP 1798029 discloses co-extruded multilayer PLA sheets having a foamed layer, free of any impact modifier. Such sheets are believed to present a poor snapability, and there is a need for different products with a better snapability.

Document WO 2007/145905 discloses a method of forming PLA foamed sheets with adding a cross-linker compound that reacts with PLA. However such sheets are hardly adapted to some packaging applications such as food applications because the foamed structure does not provide a barrier to some agents, for example to contaminants or to agents that can alter food products such as oxygen. Such sheets are also believed to present a poor snapability, and there is a need for different products with a better snapability.

Document WO 2005/042627 discloses a method of forming PLA foamed sheets by adding a foaming agent and a nucleating agent. However such sheets are hardly adapted to some packaging applications such as food applications because the foamed structure does not provide a barrier to some agents, for example to contaminants or to agents that can alter food products such as oxygen. Such sheets are also believed to present a poor snapability, and there is a need for different products with a better snapability.

The invention addresses at least one of the problems or needs above with an article comprising a multilayer plastic material comprising at least:
A) one layer A of a non-foamed polylactic acid material A comprising polylactic acid,
B) one layer B of a foamed polylactic acid material B comprising polylactic acid and being substantially free of expanded microspheres,
wherein material A and/or material B comprise an impact modifier.

In a specific embodiment, the invention concerns an article comprising a multilayer plastic material comprising at least:
A) one layer A of a non-foamed polylactic acid material A comprising polylactic acid and an impact modifier,
B) one layer B of a foamed polylactic acid material B comprising polylactic acid and being substantially free of expanded microspheres.

The invention also concerns processes that are adapted to prepare the articles.

It has been surprisingly found that the articles and/or the process of the invention allow a good processability and/or good mechanical properties such as compression resistance and/or good other properties such as snapability. It has been surprisingly found that introducing impact modifiers in non-foamed layers allows a better snapability.

DEFINITIONS

Figure 1:
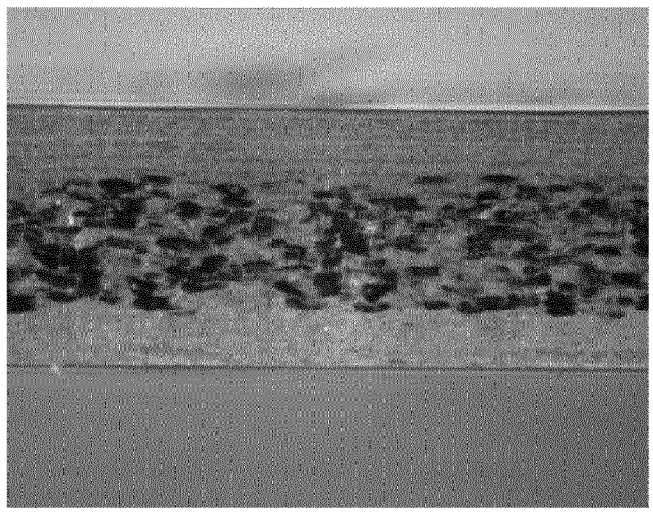
FIG. 1 shows a picture of a PLA sandwich structure obtained for an example.

In the present application a non-foamed polylactic acid (PLA) material refers to polylactic acid substantially depleted of gas inclusions, either directly in the PLA or in microspheres embedded in the PLA. Non-foamed PLA has typically a density of higher than 1.2. Non-foamed PLA is also referred to as "compact PLA".

In the present application a foamed polylactic acid (PLA) material refers to polylactic acid comprising gas inclusions, preferably directly in the PLA, typically as opposed to gas inclusions in microspheres embedded in the PLA. Foamed PLA has typically a density of up to 1.2, preferably of at less than 1.2, preferably of up to 1.1.

In the present application expandable or expanded microspheres refer to products having a polymeric shell, typically a thermoplastic shell, and a gas in the shell that can expand upon heating. Upon heating the gas pressure increases inside the shell, and the shell expands. Such products are known by the one skilled in the art and are commercially available, for example as Expancel®.

In the present application snapability (or snap ability) refers to the ability of a layered material to be divisible along a precut line under flexural solicitation.

In the present application "additives" refer to products that can be added to polylactic acid or other thermoplastic materials, different from products comprising expandable or expanded microspheres, and from impact modifiers.

Article Structure—Sheets

The article of the invention is a multilayer plastic material, preferably thermoplastic material, comprising at least:
A) one layer A of a non-foamed polylactic acid material A comprising polylactic acid,
B) one layer B of a foamed polylactic acid material B comprising polylactic acid and being substantially free of expanded microspheres,
wherein material A and/or material B comprise an impact modifier.

In one embodiment material A comprises the impact modifier and material B is free of impact modifier. In another embodiment material B comprises the impact modifier and material A is free of impact modifier. In another embodiment material A and material B comprise the impact modifier.

In a preferred embodiment, the article of the invention is a multilayer plastic material, preferably thermoplastic material, comprising at least:
A) one layer A of a non-foamed polylactic acid material A comprising polylactic acid and an impact modifier,
B) one layer B of a foamed polylactic acid material B comprising polylactic acid and being substantially free of expanded microspheres.

Material A is typically a compact polylactic acid material, preferably comprising an impact modifier, and optionally comprising further additives. The further additive content in material A can be for example of from 0% to 10% by weight, preferably of from 0.1% to 5%.

Material B is a foamed polylactic acid material, free of expanded microspheres. Herein "free of expanded microspheres" refers to a content by weight of less than 0.5%, preferably less than 0.1%, preferably less than 0.01%, preferably 0%. Material B can comprise some impact modifier, preferably in an amount of less than 1% by weight of impact modifier. It is believed that the presence of higher amounts of impact modifier in material B decrease snapability.

Material B is preferably free of impact modifiers. Herein "free of impact modifiers" refers to a content by weight of less than 0.5%, preferably less than 0.1%, preferably less than 0.01%, preferably 0%. It is believed that the absence of impact modifier in material B improves snapability.

Material B optionally comprises further additives. The further additive content in material B can be for example of from 0% to 10% by weight, preferably of from 0.1% to 5%.

It is mentioned that in a preferred embodiment the polylactic acid material comprises from 0% to 0.15% by weight, preferably from 0% to 0.1%, of cross-linking agents, typically added after polymerization, such as peroxides. In a most preferred embodiment the polylactic acid material does not comprise such cross-linking agents. It has been surprisingly found that such cross-linking agents are useless.

In one embodiment the article is a plastic sheet or a film. It has typically a thickness e. It has typically two other dimensions such as a length l and a broadness b. Typically both other dimensions l and b are at least 10 times, preferably 100 times the thickness. The plastic sheet or film can typically have a thickness of from 0.1 mm to 5 mm, preferably 0.5 mm to 2 mm, preferably from 0.6 mm to 1 mm. Examples of thicknesses are 0.5 mm, or 0.7 mm, or 0.8 mm, or 0.9 mm, or 1 mm. The broadness can be typically of from 20 cm to 200 cm. The length can be of at least 200 cm. The plastic sheets can be presented as rolls.

In one embodiment the article is a container. The container can be a thermoformed article, preferably obtained from the plastic sheet. It can be for example a bottle or a thermoformed cup, preferably in a multipack form or in an individual cup form. The container typically comprises at least a part corresponding to the multilayer structure. It can comprise a stretched part and a non-stretched part. The non-stretched part can typically correspond to the plastic sheet, with the plastic sheet thickness. The non-stretched part can be for example a flange at the periphery of a stretched part. For example the article can be a thermoformed cup, having a body corresponding to a stretched, typically thermoformed, part of a sheet, and flanges at the periphery of the body, corresponding to a non-stretched part of a sheet. Further details about containers are given below.

The article can comprise 2 or 3 layers or more. It can consist of 2 or 3 layers. It can be for example a two-layer material (layer A)-(layer B). It can be a three-layer material (layer A)-(layer B)-(layer C). It can be a three-layer material (first layer A)-(layer B)-(second layer A). First layer A and second layer A can be identical or different. The article preferably comprises at least 19% by weight, preferably at least 38% by weight of layer B. Such amounts improve density decrease of the article.

The amounts of the layers by distance along the article thickness can correspond to the following thickness profile:
layer(s) A: from 10% to 90%,
layer B: from 10% to 90%,
the total being 100% of the thickness, and wherein first layer A and second layer A have an identical or different thickness.

In a preferred embodiment the amounts of the layers by distance along the article thickness correspond to the following thickness profile:
first layer A: from 5 to 45%,
layer B: from 10 to 90%,
second layer A: from 5 to 45%,
the total being 100% of the thickness, and wherein first layer A and second layer A have an identical or different thickness.

In a preferred embodiment the amounts of the layers by distance along the article thickness correspond to the following thickness profile:
first layer A: from 10 to 30%,
layer B: from 40% to 80%,
second layer A: from 10 to 30%,
the total being 100% of the thickness, and wherein first layer A and second layer A have an identical or different thickness.

The amounts of the layers by weight of the layers can be as follow:
  layer(s) A: from 12% to 95%,
  layer B: from 5% to 88%,
the total being 100% of the thickness, and wherein first layer A and second layer A have an identical or different thickness.

In a preferred embodiment the amounts by weight are as follows:
  first layer A: from 6% to 47.5%,
  layer B: from 5% to 88%,
  second layer A: from 6% to 47.5%,
the total being 100% of the thickness, and wherein first layer A and second layer A have an identical or different thickness.

In a preferred embodiment the amounts by weight are as follows:
  first layer A: from 12% to 35%,
  layer B: from 30% to 76%,
  second layer A: from 12% to 35%,
the total being 100% of the thickness, and wherein first layer A and second layer A have an identical or different thickness.

Polylactic Acid

Polylactic Acid (PLA) polymers are known by the one skilled in the art and are commercially available. These are typically obtained by polymerization of lactic acid monomers. The lactic acid monomer is typically obtained by a microbiological process, involving micro-organisms such as bacteria.

Foaming and Foaming Agents

Material B is a foamed material comprising gas inclusions. The gas inclusions can be generated by any appropriate means different from expandable microspheres. Appropriate means include introduction of chemical foaming agents (CFAs) and direct introduction of a gas compound in a gas form or in a liquid form or in a supercritical form, such as $CO_2$, $N_2$ or alkanes, for example n-butane and/or i-butane and/or n-pentane and/or i-pentane and/or neopentane. Technologies appropriate for direct introduction of gas in polymer melt are known by the one skilled in the art.

In a preferred embodiment, one uses a chemical foaming agent (CFA). Such agents generate a gas upon processing, typically by heat activation, and thus allow a foaming. Once the gas is generated and the material is foamed, such agent typically leave a reaction adduct in the material.

Thus material B preferably contains at least one adduct of a chemical foaming agent.

The chemical foaming agent is typically a compound or mixture of compounds which undergoes thermal decomposition to generate a gas compound as a decomposition product. The choice of foaming agent can depend on the processing temperature at which material B is processed. Material B is typically processed in the barrel of an extruder. Typically the chemical foaming agent has a decomposition temperature in the range of from greater than 150° C. to 280° C. Such foaming agents are typically carbon dioxide and optionally water moisture generators. Appropriate CFAs include carbonates and bicarbonates of a metal, for example sodium bicarbonate, and/or pure citric acid. Beside $CO_2$ and optionally $H_2O$ generation, the thermal degradation of these CFA also typically generates the following by-products adducts: sodium citrate, cis-aconitic acid, trans-aconitic acid, cis-aconitic anhydride, trans-aconitic anhydride, itaconic anhydride and citraconic anhydride.

The chemical foaming agent preferably comprises citric acid, and optionally sodium bicarbonate.

The adduct is typically sodium citrate, cis-aconitic acid, trans-aconitic acid, cis-aconitic anhydride, trans-aconitic anhydride, itaconic anhydride and citraconic anhydride, or a mixture thereof.

The amount of used foaming agent can depend on the level of foaming desired in the product, and thus of the desired density. In a preferred embodiment material B has a density of from 0.5 to 1.2, preferably from 0.75 to 1.1. In a preferred embodiment the foamed polylactic acid material (Material B) comprises from 0.1 to 10% by weight, preferably from 0.5% to 4% of active CFA (for example pure citric acid or sodium bicarbonate/citric acid). In a preferred embodiment the article (including all the layers) has a density of from 0.75 to 1.2, preferably from 0.75 to lower than 1.2 or to lower than 1.0. The CFA, the amount thereof, layer(s) A, optionally further layers, and the compositions of the layers can be selected thereto.

It is mentioned that chemical foaming agents can be added in the form of masterbatches, wherein the additive is dispersed in a polymer matrix, for example PLA or a polymer of ethylenically unsaturated monomers, such as an ethylene vinyl acetate copolymer.

It is mentioned that the gas compound that is generated by the chemical foaming agent can be in a dissolved form in the polymer melt under pressure, typically in an extruder, and can transform in a gas form allowing gas inclusions upon a pressure decrease, typically after an extruder die.

Impact Modifier

Material A and/or material B comprises at least one impact modifier. Such compounds are known by the one skilled in the art, and available on the market as such. They modify the mechanical properties of thermoplastics by increasing the tensile stress of said thermoplastics. Various mechanisms can be involved, such as cavitation upon impact or diffused energy released upon impact. Compounds that have such properties are typically appropriate. Examples of impact modifiers include alkyl sulfonates, aromatic-aliphatic polyesters, poly(butylene adipate-co-terephthalate), for example those described in document EP 2065435, ethylene copolymers, for example described in document WO 2011119639, Acetyl TriButyl citrate, Triethyl citrate, Polybutylene Succinate, PolyVinyl Alcohol (PVA), ethylene vinyl acetate, hydrogenated soil oil.

In a preferred embodiment the impact modifier is a core/shell polymeric compound or an alkyl sulfonate compound.

In a preferred embodiment material A and/or material B comprises from 0.01% to 30% by weight of impact modifier, preferably from 0.1% to 10%, preferably from 0.5 to 5%.

Impact modifiers can be added in the form of masterbatches, wherein the impact modifier is dispersed in a polymer matrix, for example PLA or a polymer of ethylenically unsaturated monomers, such as an ethylene vinyl acetate copolymer.

The core-shell polymeric compound, also referred to as core-shell copolymer, is typically in the form of fine particles having an elastomer core and at least one thermoplastic shell, the particle size being generally less than 1 micron and advantageously between 150 and 500 nm, and preferably from 200 nm to 450 nm. The core-shell copolymers may be monodisperse or polydisperse.

By way of example of the core, mention may be made of isoprene homopolymers or butadiene homopolymers, copolymers of isoprene with at most 3 mol % of a vinyl monomer and copolymers of butadiene with at most 35 mol % of a vinyl monomer, and preferable 30 mmol % or less. The vinyl monomer may be styrene, an alkylstyrene, acrylonitrile or an alkyl(meth)acrylate. Another core family consists of the homopolymers of an alkyl (meth)acrylate and the copolymers of an alkyl(meth)acrylate with at most 35 mol % of a vinyl monomer, and preferable 30 mol % or less. The alkyl(meth)acrylate is advantageously butyl acrylate. Another alternative consists in an all acrylic copolymer of 2-octylacrylate with a lower alkyl acrylate such as n-butyl-, ethyl-, isobutyl- or 2-ethylhexyl-acrylate. The alkyl acrylate is advantageously butyl acrylate or 2-ethylhexyl-acrylate or mixtures thereof. According to a more preferred embodiment, the comonomer of 2-octylacrylate is chosen among butyl acrylate and 2-ethylhexyl acrylate. The vinyl monomer may be styrene, an alkylstyrene, acrylonitrile, butadiene or isoprene. The core of the copolymer may be completely or partly crosslinked. All that is required is to add at least difunctional monomers during the preparation of the core; these monomers may be chosen from poly(meth)acrylic esters of polyols, such as butylene di(meth)acrylate and trimethylolpropane trimethacrylate. Other difunctional monomers are, for example, divinylbenzene, trivinylbenzene, vinyl acrylate and vinyl methacrylate. The core can also be crosslinked by introducing into it, by grafting, or as a comonomer during the polymerization, unsaturated functional monomers such as anhydrides of unsaturated carboxylic acids, unsaturated carboxylic acids and unsaturated epoxides. Mention may be made, by way of example, of maleic anhydride, (meth)acrylic acid and glycidyl methacrylate.

The shells are typically styrene homopolymers, alkylstyrene homopolymers or methyl methacrylate homopolymers, or copolymers comprising at least 70 mol % of one of the above monomers and at least one comonomer chosen from the other above monomers, vinyl acetate and acrylonitrile. The shell may be functionalized by introducing into it, by grafting or as a comonomer during the polymerization, unsaturated functional monomers such as anhydrides of unsaturated carboxylic acids, unsaturated carboxylic acids and unsaturated epoxides. Mention may be made, for example, of maleic anhydride, (meth)acrylic acid and glycidyl methacrylate. By way of example, mention may be made of core-shell copolymers (A) having a polystyrene shell and core-shell copolymers (A) having a PMMA shell. The shell could also contain functional or hydrophilic groups to aid in dispersion and compatibility with different polymer phases. There are also core-shell copolymers (A) having two shells, one made of polystyrene and the other, on the outside, made of PMMA. Examples of copolymers (A) and their method of preparation are described in the following U.S. Pat. No. 4,180,494, U.S. Pat. No. 3,808,180, U.S. Pat. No. 4,096,202, U.S. Pat. No. 4,260,693, U.S. Pat. No. 3,287,443, U.S. Pat. No. 3,657,391, U.S. Pat. No. 4,299,928 and U.S. Pat. No. 3,985,704.

The core/shell ratio can be for example in a range between 10/90 and 90/10, more preferably 40/60 and 90/10 advantageously 60/40 to 90/10 and most advantageously between 70/30 and 95/15.

Examples of appropriate core/shell impact modifiers include Biostrength ranges, for example Biostrength 150, marketed by Arkema.

Further Additives

Material A and/or material B can comprise further additives. Herein further additives are understood as compounds different from impact modifiers and expandable microspheres. Further additives in material A and/or material B, if present, can be identical or different. Additives that can be used include for example:

nucleating agent such as talc
fillers,
aspect modifiers, such as pigments or colorants,
stabilizers,
lubricants,
mixtures or associations thereof.

Nucleating agents are for example; talc particles. Such agent can accelerate the foam production, and/or help in controlling the gas inclusion size. Such agents are available on the market, for example in the form of masterbatches.

Pigments can be for example $TiO_2$ pigments, for example described in document WO 2011119639.

The further additives can be added in the form of masterbatches, wherein the additive is dispersed in a polymer matrix, for example PLA or a polymer of ethylenically unsaturated monomers, such as an ethylene vinyl acetate copolymer.

Further additives, if present, in material A and/or material B can be typically present in an amount of 0.1% to 15% by weight, for example in an amount of 1% to 10% by weight.

Containers

The article can be a container, for example a container used as a dairy product container, like a yogurt cup. The invention also concerns the container filled with a food or non-food product, preferably a dairy product, preferably a milk-based (milk being an animal milk or a vegetal milk substitute such as soy milk or rice milk etc. . . . ) product, preferably a fermented dairy product, for example a yogurt. The container can have a yogurt cup shape, for example with a square cross section or a square with rounded corners cross section, or round cross section. The container can have a tapered bottom, preferably a tapered rounded bottom. The container has walls (perpendicular to the cross section) that can be provided with elements such as stickers or banderoles. Elements such as banderoles can contribute to re-enforcing the mechanical resistance of the container. The container can be for example a container of 50 ml (or 50 g), to 1 L (or 1 kg), for example a container of 50 ml (or 50 g) to 80 ml (or 80 g), or 80 ml (or 80 g) to 100 ml (or 100 g), or 100 ml (or 100 g) to 125 ml (or 125 g), or 125 ml (or 125 g) to 150 ml (or 150 g), or 150 ml (or 150 g) to 200 ml (or 200 g), or 250 ml (or 250 g) to 300 ml (or 300 g), or 300 ml (or 300 g) to 500 ml (or 500 g), or 500 ml (or 500 g) to 750 ml (or 750 g), or 750 ml (or 750 g) to 1 L (or 1 kg).

Process

The article can be prepared by any appropriate process. Material A and/or material B can be prepared before forming the article or during the formation of the article. Thermoplastic materials, such as PLA, can be introduced in the form of powder, pellets or granules.

Typically the process comprises a step of mixing polylactic acid and a chemical foaming agent, and a step of heating to generate a gas compound from the chemical foaming agent.

Material A is a mixture of several ingredients: at least PLA and impact modifier. These ingredients can be mixed upon forming the article, typically in an extruder. One can implement masterbatches impact modifiers and optionally of further additives to be mixed with a thermoplastic material. In another embodiment one can use pre-mixed compounds typically in the form of powder, pellets or granules.

Material B can be a mixture of ingredients, for example polylactic acid and gas, or polylactic acid and chemical foaming agent. These ingredients can be mixed upon forming the article, typically in an extruder. One can implement masterbatches of chemical forming agents and optionally of further additives, or even several masterbatches, to be mixed with polylactic acid. In another embodiment one can use pre-mixed compounds in the form of powder, pellets or granules. Useful processes typically include a step of mixing polylactic acid and chemical foaming agents, and a step of heating to generate gas compounds. These gas compounds can be dissolved in the matrix of material B, and then expand as gas when pressure decreases, typically after a die of an extruder, allowing Material B to expand. The heating temperature can be for example of from 150° C. to 250° C., for example from 180° C. to 230° C., preferably from 150° C. to 200° C. or from 200° C. to 230° C. Heating can be performed during the mixing step or in a further step. Mixing and/or heating can be performed in an extruder, in an extrusion step. Heating is typically performed during an extrusion step to form layer B.

In one embodiment the chemical foaming agent comprises citric acid, and optionally sodium bicarbonate, and the gas compound that is generated comprises $CO_2$, $H_2O$ is optionally also generated.

In a preferred embodiment layer A and layer B are co-extruded, typically from material A and material B flows in a molten form. Co-extrusion processes are known from the one skilled in the art. These typically involve extruding separates flows through separates side by side dies. Beyond the dies the flows merge and form at least one interface. There is one interface for two-layer articles and two interfaces for three-layer articles. The materials are then cooled to form a solid article. One can implement appropriate treatments after the co-extrusion in order to obtain the desired product, for example a sheet or a film. Treatment steps are for example press treatments, calendering, stretching etc. . . . . Parameters of these treatment steps such as temperatures, pressure, speed, number of treatments can be adapted to obtain the desired product, for example a sheet. In one embodiment the article is a sheet prepared by a process involving co-extruding and calendering.

In one embodiment the article is a thermoformed container obtained from a plastic sheet. The thermoformed article is preferably obtained by:
1) co-extruding at least layer A and layer B to obtain a multilayer plastic sheet, and
2) thermoforming the plastic sheet to obtain a container.

Thermoforming is a known operation. Herein thermoforming refers to any process wherein a plastic material is heated and stretched into a cavity, for example with a plug (this being the conventional thermoforming) and/or by blowing. One can thermoform the sheet so as to obtain the final product of the desired shape. It is mentioned that some stretching occurs upon thermoforming. Thermoforming may be for example performed thanks to a Form Fill Seal thermoforming line. Such a process is well adapted for obtaining cups in a multipack form. Alternatively thermoforming can be performed according to a single-cup forming process, to provide individual cups there preformed before filling. In one embodiment one implements a process wherein a sheet is transformed into strips, the strips are shaped into a tube and welded, and then the tube is blown in a mold. Such a process and an equipment therefore is for example marketed as "Roll N Blow" by Agami and/or described in documents FR2851227 and/or WO201007004.

The thermoforming can present the following steps:
sheet introduction on guide chains (i.e. spike or jaws);
sheet heating, by heating contact plates;
forming thanks to a negative mold, assisted by forming plugs and air pressure. The mold may comprise or not a label.

In a Form Fill Seal thermoforming line, one typically performs the following steps after the thermoforming:
the resulting forms are filled with a product, and then, thermosealed with a lid film,
finally, they are cut and optionally precut by one or several mechanical trimming tool(s).

Further details or advantages of the invention might appear in the following non limitative examples.

EXAMPLES

The examples are implemented with using the following materials:
PLA: Ingeo® 2003D marketed by NatureWorks
Impact modifier 1 (IM1): Biostrength 150 marketed by Arkema, in the form of a 50% wt % PLA masterbatch
Chemical foaming agent 1 (CFA1): Citric acid masterbatch (40% of CFA1 in PLA)
Chemical foaming agent 2 (CFA2): Citric acid+Sodium Bicarbonate masterbatch (30% of CFA1 in PLA)

Example 1—Plastic Sheet

Examples 1.3-1.5

Three-layer PLA expanded plastic sheets are prepared according to the following procedure.
Procedure for Example 1.3-1.5:
The multilayer structure is produced by co-extrusion.
The materials (PLA, CFA masterbatches and impact modifier masterbatches) of the internal foamed PLA layer are extruded with a Fairex extruder having an internal diameter of 45 mm and a 24D length. With CFA1, the temperature profile along the screw is comprised between 165 and 230° C. With CFA2, the temperature profile along the screw is comprised between 165 and 220° C.

The materials (PLA and masterbatches) of the two external compact layers are extruded with one Scannex extruder having an internal diameter of 30 mm and a 26D length. The obtained molten PLA is then separated in two different flows in the feedblock to form the external compact layers. The temperature along the screw is comprised between 165 and 195° C. After the extruders, the different PLA flows are fed into feedblock channels through different passages separated by two thin planes (die). At the end of the separation planes, the three flows merge and form two interfaces, and the sheet is extruded through a die with a temperature comprised between 185 and 195° C. The sheet is then calendered on 3 rolls that get a temperature of 40° C. The pressure between the first and second calendar roll is maintained to zero to stabilize the foam structure and to avoid any collapsing of the expanded structure.

Comparative Examples 1.1-1.2

As references, two compact PLA plastic sheets (PLA with and without impact modifiers) are prepared according to the following procedure.
Procedure for Comparative Examples 1.1-1.2:
The materials (PLA and masterbatches) of the compact layer are extruded with a Fairex extruder having an internal diameter of 45 mm and a 24D length. The temperature along the screw is comprised between 180 and 200° C. The molten PLA is extruded through a die with temperature comprised between 185 and 195° C. to produce a compact sheet. The sheet is then calendered on 3 rolls that get a temperature of 40° C.

Table I below presents compositions of various compact or layered sheets (contents are provided by weight).

TABLE I

| | Chemical foaming agent | Impact modifier | Layer | Layer repartition along sheet thickness (by distance) | Layer repartition along sheet thickness (by weight) | PLA Content (by weight) | CFA masterbatch content (by weight) | Impact modifier content (by weight) |
|---|---|---|---|---|---|---|---|---|
| Example 1.1 (comparative) | Virgin compact PLA | / | / | Compact layer | 100% | 100% | 100% | / | / |
| Example 1.2 (comparative) | PLA compact 1 | / | IM1 | Compact layer | 100% | 100% | 99% | / | 1% |
| Example 1.3 | PLA foam 1 | CFA1 | IM1 | Compact layer | 22% | 26% | 99% | / | 1% |
| | | | | Foamed Layer | 58% | 51% | 98% | 2% | / |
| | | | | Compact layer | 20% | 23% | 99% | / | 1% |
| Example 1.4 | PLA foam 2 | CFA2 | IM1 | Compact layer | 21% | 24% | 99% | / | 1% |
| | | | | Foamed Layer | 62% | 56% | 98% | 2% | / |
| | | | | Compact layer | 17% | 20% | 99% | / | 1% |
| Example 1.5 | PLA loam 3 | CFA1 | IM1 | Compact layer | 22% | 26% | 99% | / | 1% |
| | | | | Foamed Layer | 58% | 51% | 97% | 2% | 1% |
| | | | | Compact layer | 20% | 23% | 99% | / | 1% |

Evaluations

For both Examples 1.3 and 1.4, no significant decrease in the foamed PLA viscosity (compared to non-foamed PLA) is observed during extrusion, attesting that the $CO_2$ and water moisture generated during the sheet production do not degrade PLA. As a consequence, the foamed and compact PLA have almost the same viscosities, facilitating the merging of the different PLA flows into the feedblock and then extrusion through the die.

The overall thickness of the sheets of all examples and comparative examples is 700 μm. The layer repartition of the multilayer structure is confirmed by optical microscopy. A picture of PLA's sandwich structure obtained for example 1.3 is presented in FIG. 1. The foam structure is easily seen, attesting for the PLA to be foamed.

The density of the sheet is determined by gravimetric measurements and is equal to 1.07 for examples 1.3, 1.4, and 1.5. This result attests for a density drop compared to compact PLA (comparative examples 1.1 and 1.2 have a density of 1.25).

Example 2—Yogurt Cups

The plastic sheets of example 1 are thermoformed into yogurt cups according to the procedure below.
Procedure:
The sheet is introduced into a F.F.S. thermoforming line and is then transformed with the following parameters:
 Heating plates temperatures: 90° C.;
 The sheet is gradually heated thanks to six heating steps, each of the heating boxes having a closing time of 140 ms;
 The thermoforming step is performed with conventional felt forming plugs;
 Mold temperature is fixed at 40° C. to activate the label hot melt and to cool down the PLA material;
 Forming air pressure: 4 bars;
 Blowing time: 200 ms
 Machine speed: 29 strokes per minute.
The yogurt cups are cut into ×2 attached cup (referred to as "multipack"), with a precut line between each of the 2 cups. The precut lines are performed on the F.F.S. equipment. Various depths are implemented and controlled by operators.

Evaluations:
The yogurt cup mechanical performances are determined by compression tests referred as Top Load. The Top Load value is evaluated according to the following protocol:
 Use of a tensile/compression test machine type ADAMEL LHOMARGY DY 34
 Apply compression on cups (by 2 cups) with a speed of 10 mm/min at ambient temperature
 Evaluate top load value as: maximum of compression curve.
As a reference, top load results recorded from compact PLA cups produced with PLA sheet having a thickness of 650 μm have been incorporated.
The depth of the precut line is measured by optical microscopy with at least 3 measurements.
The snapability is determined by hand measurements with a marking scale that represents the ability of the cups to be separated under flexural solicitation:
 Mark 0—Do not break in three solicitations or do not follow the precut line;
 Mark 1—Break in three solicitations and follow precut line
 Mark 3—Break in two solicitations and follow precut line;
 Mark 5—Break in one solicitation and follow precut line.
Then, the snapability is compared to the precut depth to determine the minimum precut depth required to obtain a good snapability.
Results of the Evaluations:
No issue was reported during thermoforming step, the foamed and compact PLA thickness profile measured being close. Thus, the foam structure does not alter the thermoforming step.
The mechanical performances of the cup are determined from compression measurements:
 Compact PLA 1 sheet's: density d=1.25, Top load=53.3±4.1 daN
 PLA foam1 sheet's: density d=1.07, Top load=59.9±2.9 daN
 PLA Foam2 sheet's: density d=1.07, Top load=60.6±6.5 daN
 PLA Foam3 sheet's: density d=1.08, Top load=58.2±3.4 daN
These top load performances are in line with performances required with conventional materials such as compact polystyrene.

Contrary to compact PLA (comparative example 1.1), no residual brittleness is observed during sheet introduction into the F.F.S. thermoforming line with compact and foamed PLA modified with impact modifiers (examples 1.3, 1.4, 1.5).

Figure 2:
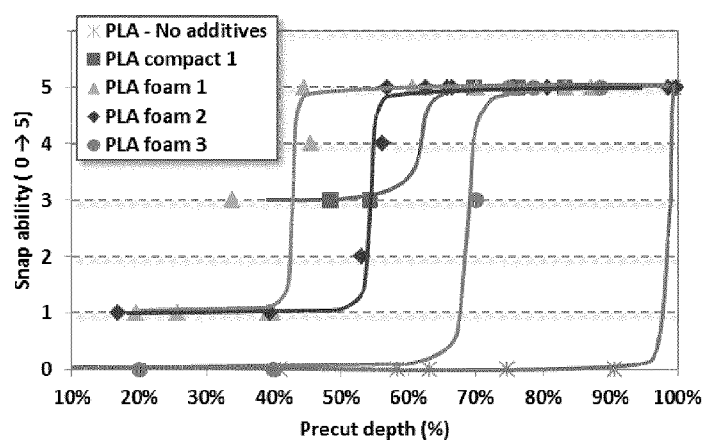
FIG. 2 presents snapability marks as a function of precut depths for some examples.

FIG. 2 presents the snapability mark as a function of precut depth for PLA No additives (comparative example 1.1), compact PLA 1 (comparative example 1.3), and foam PLA 1 (example 1.3), 2 (example 1.4) and 3 (example 1.5).

It is seen that without impact modifiers, it is not possible to separate the cups without affecting their integrities (the precut depth required is 100% which is a full cut).

Compact PLA 1 (comparative example 1.2) becomes really snapable, with a mark of higher than 3, for precut depth deeper than 62%.

PLA foam 1 (example 1.3) & PLA foam 2 (example 1.4) presents a lower precut depth to reach a mark of 5, namely 40% and 55%. Aside, it is noted that pure citric CFA1 acid favors snapability, compared to CFA2.

Figure 3:
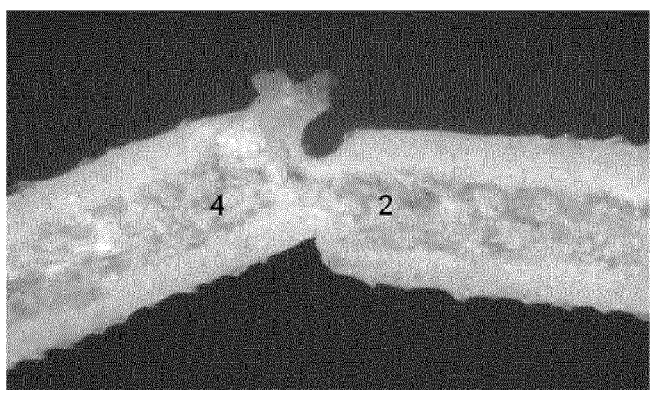
FIG. 3 shows a picture of a precut performed on a PLA sheet.

Finally, it is seen that with PLA foam 3 (example 1.5), which contains impact modifier in the expanded layer, the precut depth has to be deeper than 70% to reach a mark of 5. This result is explained by FIG. 3, which presents a picture of the precut performed on the PLA foam 3 (example 1.5) sheet. It is seen that expanded layer is deformed by the impact of the blades and that no real precut is performed.

These results show that impact modifiers are needed to obtain a good snapability and that there is no need for an impact modifier in the expanded layer to reach a good snapability. Such a structure enhances the breakability of the cups compared to compact PLA with impact modifier. To the opposite, with impact modifier in the expanded layer, the snapability is slightly altered because of the deformation of the expanded layer.

The invention claimed is:

1. An article comprising a multilayer plastic material comprising:
   A) at least one layer A of a non-foamed polylactic acid material A comprising polylactic acid and an impact modifier,
   B) at least one layer B of a foamed polylactic acid material B comprising polylactic acid and being substantially free of: (i) expanded microspheres and (ii) impact modifier.

2. The article according to claim 1, wherein the material B contains at least one adduct of a chemical foaming agent.

3. The article according to claim 2, wherein the chemical foaming agent comprises at least one of citric acid or sodium bicarbonate.

4. The article according to claim 2, wherein the adduct is at least one of sodium citrate, cis-aconitic acid, trans-aconitic acid, cis-aconitic anhydride, trans-aconitic anhydride, itaconic anhydride and citraconic anhydride, or a mixture thereof.

5. The article according to claim 1, wherein the material B has a density of from 0.5 to 1.2 $g/cm^3$.

6. The article according to claim 1, having a density of from 0.75 to 1.2 $g/cm^3$.

7. The article according to claim 1, wherein the impact modifier is a core/shell polymeric compound, an alkyl sulfonate compound, Acetyl TriButyl citrate, Triethyl citrate, Polybutylene Succinate, PVA or ethylene vinyl acetate.

8. The article according to claim 1, wherein the material A comprises from 0.01% to 30% by weight of the impact modifier.

9. The article according to claim 1, comprising at least 19% by weight of the at least one layer B.

10. The article according to claim 1, wherein the article is a three-layer material (first layer A)-(layer B)-(second layer A).

11. The article according to claim 10, wherein amounts of the layers by distance along an article thickness correspond to the following profile:
    the first layer A: from 5 to 45%,
    the layer B: from 10 to 90%,
    the second layer A: from 5 to 45%,
    the total being 100% of the article thickness.

12. The article according to claim 1, wherein the article is a plastic sheet.

13. The article according to claim 12, wherein the plastic sheet has a thickness of from 0.5 mm to 2 mm.

14. The article according to claim 1, wherein the article is a container.

15. The article according to claim 14, wherein the container is a thermoformed article.

16. The article according to claim 14, wherein the article is selected from the group consisting of a bottle and a thermoformed cup.

17. A process of making an article according to claim 1, comprising a step of mixing polylactic acid and a chemical foaming agent to form a mixture, and a step of heating the mixture to generate a gas compound from the chemical foaming agent.

18. The process according to claim 17, wherein the chemical foaming agent is at least one of citric acid or sodium bicarbonate, and wherein the gas compound comprises $CO_2$.

19. The process according to claim 17, wherein heating is performed at a temperature of from 150 to 250° C.

20. The process according to claim 17, wherein heating is performed during an extrusion step to form the at least one layer B.

21. The process according to claim 17, wherein the at least one layer A and the at least one layer B are co-extruded.

22. The process according to claim 17, wherein the article is a thermoformed container obtained by:
    1) co-extruding the at least one layer A and the at least one layer B to obtain a multilayer plastic sheet, and
    2) thermoforming the plastic sheet to obtain the thermoformed container.

* * * * *